Patented Aug. 24, 1937

2,091,062

UNITED STATES PATENT OFFICE

2,091,062

SPRAY OIL EMULSIFIER

Wallace J. Yates, Martinez, Calif., assignor to Shell Development Company, San Francisco, Calif., a corporation of Delaware No Drawing. Application December 10, 1934, Serial No. 756,833

12 Claims. (Cl. 167—43)

This invention pertains to the manufacturing of insecticidal spray oils and is more particularly concerned with methods of producing emulsions of such oils in water.

Petroleum oils, when used as insecticides, are usually mixed with water in the proportions of about 1% to 2% of oil for foliage spraying and up to 6% or more of oil for dormant spraying. The water, by reducing the oil content in the spray mixture, assists in regulating the amount of oil applied and prevents damage to the vegetation sprayed. In addition to oil and water, spraying compositions practically always contain an emulsifier, which serves the following principal purposes:

(1) It assists in effecting an even distribution of the oil with the water in the spray tank;

(2) It should spread the oil evenly over surfaces sprayed, and regulate the amount of oil deposited, and (3) It prevents the separation of concentrated emulsions in layers while in storage.

The emulsifier may be dissolved either in the oil or in the water. In concentrated commercial emulsions which contain the emulsifier dissolved in the aqueous phase, the emulsifier, as stated above, serves to stabilize the emulsion during storage. In sprays containing an emulsifier dissolved in oil no such stabilizing action is necessary, since the oil is not emulsified until added to the spray tank. Another advantage of dissolving the emulsifier in the oil, as compared to concentrated commercial emulsions, is the greater ease of handling and in the case of a suitable emulsifier, improved spreading action.

It is known in the art to use alcohols as emulsifiers in spray compositions. It must, however, be stated that this use was confined either to low-boiling alcohols, that is, alcohols of low molecular weight and therefore soluble in water, or else, to partly esterified polyhydric alcohols.

It has now been found that water-insoluble alcohols having certain characteristics as described below possess the necessary requisites of spray oil emulsifiers, are difficultly washed out of oil when it comes in contact with water, and, therefore, may be very successfully used for the purposes of this invention.

While any of the alcohols above hexyl alcohol, being insoluble in water, could be used for the purposes of this invention, it has been found that the best results are obtained with alcohols having from 10 to about 16 carbon atoms to the molecule, their effectiveness as emulsifiers decreasing both below and above these limits.

This is true not only of primary, secondary and tertiary alcohols of the saturated series $C_nH_{2n+1}OH$, but also of the unsaturated alcohols containing one double bond $(C_nH_{2n-1}OH)$, the $C_nH_{2n-3}OH$ group, which might contain three double bonds or two triple bonds, and others. In fact, it has been noted that the presence of double bonds in the molecule of alcohols improves their qualities as emulsifiers and widens the limits of molecular composition between which they can be used as such. Thus, stenol (stearyl alcohol) which is a saturated alcohol of the formula $C_{18}H_{37}OH$, stands outside of the range given above and is, therefore, a relatively poor emulsifier, while ocenol (oleyl alcohol), an unsaturated alcohol of the formula $C_{18}H_{35}OH$ exhibits excellent emulsifying properties and compares favorably with such saturated alcohols as lorol of the formula $C_{12}H_{25}OH$ (dodecyl alcohol). Other examples of unsaturated alcohols suitable for the purposes of this invention are the alcohols of linolic and of linolenic acids, whose formulas are respectively $C_{18}H_{32}OH$ and $C_{18}H_{31}OH$. For unsaturated alcohols, the desirable range of molecular weights may, therefore, be somewhat extended in the direction of greater molecular weights, namely, to include alcohols containing up to and including 22 carbon atoms.

In accordance with my invention, it follows that excellent oil emulsifying properties are possessed by derivatives of the above mentioned alcohols formed by the incorporation of one or more active groups or atoms in the molecule, such as halogen, oxygen, sulfur, selenium, amino, and hydroxy groups. The general formula for such modified alcohols is represented by $$C_nH_{2n-m+1}X_mOH$$

where X represents the substituent atom or radical. It is, of course, understood that derivatives with an unsaturated aliphatic chain may be equally well used for the purposes of this invention.

As examples of such alcoholic derivatives the following may be given by way of illustration, without, however, in any way limiting this invention to the specific compounds mentioned:

Chlor- and bromo-derivatives of oleyl and linoleyl alcohols; oxy-derivatives of linoleyl alcohol; sulfo-derivatives of linoleyl alcohol; selenium derivatives of linoleyl alcohol; amino derivatives of oleyl alcohol; the dihydroxy alcohol derived from sabinic acid; the dihydroxy alcohol derived from ricinoleic acid; the trihydroxy alcohol derived from dihydroxy stearic acid.

Mixed substituted alcohols, such as for example as the chlor-oxy, chlor-amino, oxy-amino, etc. derivatives of the alcohols mentioned above can equally well be used according to this invention.

The range of molecular weights in which the above substituted alcohols are effective as spray oil emulsifiers is wider than that of the corresponding saturated or unsaturated straight alcohol; thus in the case of hydroxy, di-hydroxy and tri-hydroxy alcohols, a carbon chain having a minimum of 10 and a maximum of 32 carbon atoms was found to be most effective, while in the case of the substituted alcohols the lower limit is still 10 carbon atoms, while no upper limit can be set, since long chain alcohols are very effective emulsifiers when substituted with a suitable number of reactive radicals or atoms of the groups given above.

It has also been found that by subjecting alcohols to oxygenation, halogenation, sulfation and similar processes, and using suitable operating conditions known to the art, it is possible to obtain products which are very effective as spray oil emulsifiers. Thus, chlorine may be passed through an alcohol of sufficiently high molecular weight, whereby the constitution of the alcohol molecules is changed with the result that besides the properties of the alcohol, the mixture acquires properties of a halogenated material. In the same way, alcohols may be subjected to oxygenation or to treatment with selenium or sulfur, to produce mixtures of corresponding substitution derivatives.

The influence of the molecular weight and of the state of saturation of different alcohols with regard to their emulsifying action was determined by the following method: 1 part of oil containing an oil soluble emulsifier was added to 49 parts of water, and the whole stirred with a high speed mixer for one minute. The amount of free oil separated was measured after 1½ hours' settling period. The results for various alcohols taken within the range specified above are shown in the following table:

Table

| Emulsifier | Structure | Iodine value | Percent oil retained in emulsion | |
|---|---|---|---|---|
| | | | 0.5% emulsifier | 0.25% emulsifier |
| Lorol (lauric alcohol) | Principally $C_{12}H_{25}OH$ | 1 | 90 | 73 |
| Cetyl alcohol (pure) | $C_{16}H_{33}OH$ | | 67 | 50 |
| Stenol (stearyl alcohol) | Principally $C_{18}H_{37}OH$ | 1 | 56 | 40 |
| Ocenol (oleyl alcohol) | Principally $C_{18}H_{35}OH$ | 80 | 80 | 75 |
| Cetyl alcohol (commercial) | | 4 | 70 | 66 |
| Alcohols from sperm oil | | 64 | 80 | 72 |

When no emulsifier was used, about 30% of oil was retained in emulsion after 1½ hours of settling.

These data clearly show the emulsifying action of suitable alcohols and the influence of the factor studied. It should also be remarked that it is not necessary that a particular alcohol used as emulsifier should be chemically pure. All the alcohols listed on the table are commercially obtainable products and are known by their trade names, for example, lorol (lauric alcohol) is substantially a saturated dodecyl alcohol, but contains also a certain amount of other alcohols of different structure, without their presence affecting the effectiveness of lorol for the purposes of this invention. Likewise, an alcohol obtained, for example by the hydrolysis of a commercial grade of sperm oil exhibited excellent emulsifying qualities.

Alcohols of the types described have been investigated also from the standpoint of other factors affecting their quality for the use in oil sprays. Of primary importance, it has been found that emulsions of oils containing these alcohols, spread readily on plant surfaces and at the same time deposit a film of desirable thickness. The magnitude of these effects is, of course, influenced by the proportion of alcohol dissolved in spray oil and can be regulated by this means. The preferred quantities vary with the several emulsifiers and for particular applications in general 2% or less is required.

If it is desired to use a more stable emulsion than is obtainable with an alcohol alone, the emulsion can be further stabilized with the conventional water soluble emulsifiers, at the same time retaining the superior spreading qualities imparted by the alcohol.

Although it has been stated at the beginning of the specification that this invention pertains to the use of water-insoluble emulsifiers, it has sometimes been found advantageous to use water-insoluble alcohols in combination with water-soluble emulsifiers, such as soaps, casein, etc., in so-called concentrated commercial emulsions, or tank mix applications, wherein the water soluble emulsifier serves to tighten the emulsion, thereby reducing tendency for stratification in the spray tank, and requiring less agitation in the spray tank than is necessary when less stable emulsions are used. The water insoluble alcohol assists in spreading the spray mixture evenly and in depositing a film of desirable thickness over sprayed surfaces.

In all applications of spray oil carried out to date according to this invention, there has been no evidence of plant injury occasioned by the use of the emulsifier and, in fact, it is believed that the alcohols described are less apt to cause injury than some of the emulsifiers at present commercially used.

I claim as my invention:

1. An emulsifiable anhydrous spray oil composition consisting of a solution of a normally liquid plant spray mineral oil and a small quantity of a water-insoluble aliphatic alcohol selected from the group consisting of: saturated alcohols having from 10 to 16 carbon atoms to the molecule, unsaturated alcohols having from 10 to 22 carbon atoms to the molecule, and substituted alcohols having at least 10 carbon atoms to the molecule and containing at least one substituted radical selected from the group: halogen, oxygen, sulfur, selenium, amines, and hydroxyl.

2. An emulsifiable anhydrous spray oil composition consisting of a solution of normally liquid plant spray mineral oil and a small quantity of a water insoluble aliphatic saturated alcohol containing from 10 to 16 carbon atoms to the molecule as sole emulsifier.

3. An emulsifiable anhydrous spray oil composition consisting of a solution of a normally liquid plant spray mineral oil and a water insoluble aliphatic unsaturated alcohol containing from 10 to 22 carbon atoms to the molecule.

4. An emulsifiable anhydrous spray oil composition consisting of a solution of a normally liquid plant spray mineral oil and an aliphatic unsaturated alcohol containing more than 10 carbon atoms and having more than one double bond per molecule.

5. An emulsifiable anhydrous spray oil composition consisting of a normally liquid plant spray mineral oil and a commercial alcohol consisting substantially of oleyl alcohol.

6. An emulsifiable anhydrous spray oil composition consisting of a normally liquid plant spray mineral oil and a small quantity of a substituted aliphatic alcohol having at least 10 carbon atoms to the molecule, and containing at least one substituted radical selected from the following group: halogens, oxygen, sulfur, selenium, amines, and hydroxy.

7. An emulsifiable anhydrous spray oil composition consisting of a normally liquid plant spray mineral oil and a small quantity of a hydroxy-substituted alcohol having at least 10 carbon atoms to the molecule.

8. An emulsifiable anhydrous spray oil composition consisting of a normally liquid plant spray mineral oil and a small quantity of a sulfo-derivative of an alcohol having at least 10 carbon atoms to the molecule.

9. A soap-free spray oil emulsion consisting of water, a normally liquid plant spray mineral oil, a water soluble emulsifier, and a small quantity of a water insoluble substituted aliphatic alcohol having at least 10 carbon atoms to the molecule and containing at least one substituted radical selected from the following group: halogen, oxygen, sulfur, selenium, amines and hydroxyl.

10. A soap-free spray oil emulsion consisting of water, normally liquid plant spray mineral oil, and a small quantity of a water insoluble aliphatic alcohol having at least 10 carbon atoms to one molecule as sole emulsifier.

11. A soap-free spray oil emulsion consisting of water, a normally liquid plant spray mineral oil, a water soluble emulsifier, and a small quantity of a water insoluble aliphatic unsaturated alcohol having from 10 to 22 carbon atoms to one molecule.

12. In the process of preparing soap-free spray emulsions, the steps of, first, dissolving a relatively small amount of a water-insoluble aliphatic alcohol in a normally liquid plant spray mineral oil and then emulsifying the oil-alcohol solution in water by intermingling the two liquids in the absence of additional emulsifiers.

WALLACE J. YATES.